(12) United States Patent
Bircham

(10) Patent No.: US 11,280,095 B2
(45) Date of Patent: Mar. 22, 2022

(54) PANELS IMITATING ORGANIC WOOD PLANKS COMPRISING SPECIALLY DECORATED EDGES

(71) Applicant: Xylo Technologies AG, Niederteufen (CH)

(72) Inventor: Mark Bircham, Rosenheim (DE)

(73) Assignee: Xylo Technologies AG, Niederteufen (CH)

(*) Notice: Subject to any disclaimer, the term of this patent is extended or adjusted under 35 U.S.C. 154(b) by 234 days.

(21) Appl. No.: 16/469,522

(22) PCT Filed: Dec. 23, 2016

(86) PCT No.: PCT/EP2016/082594
§ 371 (c)(1),
(2) Date: Jun. 13, 2019

(87) PCT Pub. No.: WO2018/114001
PCT Pub. Date: Jun. 28, 2018

(65) Prior Publication Data
US 2020/0109571 A1    Apr. 9, 2020

(51) Int. Cl.
*E04F 15/04*    (2006.01)
*E04F 13/08*    (2006.01)
(Continued)

(52) U.S. Cl.
CPC .............. *E04F 15/04* (2013.01); *B32B 3/02* (2013.01); *B32B 3/06* (2013.01); *B32B 3/30* (2013.01);
(Continued)

(58) Field of Classification Search
CPC ..... E04F 15/04; E04F 15/02161; E04F 13/10; B32B 3/02; B32B 2419/04; B44C 1/24; B44C 5/04
See application file for complete search history.

(56) References Cited

U.S. PATENT DOCUMENTS 8,316,604 B2    11/2012    Thiers
8,431,054 B2    4/2013    Pervan et al.
(Continued)

FOREIGN PATENT DOCUMENTS

CN    2353504 Y    12/1999
CN    101300141 A    11/2008
(Continued)

OTHER PUBLICATIONS

"White Seamless Wavy Tile Textured Panel", WallsHeaven, https://www.wallsheaven.com/wall-murals/white-seamless-wavy-tile-textured-panel-C27121553 (Year: 2013).*
(Continued)

*Primary Examiner* — Jasper Saberi
(74) *Attorney, Agent, or Firm* — Crowell & Moring LLP

(57) ABSTRACT

A rectangular panel for floor-, wall- or ceiling coverings is provided comprising a visible decorative side, wherein the decorative side comprises at least one undulated edge line, which extends along the long side edges of the panel, said undulated edge line having a different design than the rest of the decorative side. In the provided panel(s), the physical edges and the optical edges may diverge, which provides the possibility that multiple panels can be installed as floor ceiling or wall covering in a way that the physical edges in a corresponding covering become almost invisible whereas the optical edges (i.e. the undulated edge lines) are perceived as artificial optical edge of virtual panels forming the covering.

15 Claims, 3 Drawing Sheets

(51) Int. Cl.

| | |
|---|---|
| *E04F 13/10* | (2006.01) |
| *B32B 21/04* | (2006.01) |
| *B32B 3/30* | (2006.01) |
| *E04F 15/02* | (2006.01) |
| *B32B 21/02* | (2006.01) |
| *B32B 3/06* | (2006.01) |
| *B32B 3/02* | (2006.01) |
| *B32B 9/04* | (2006.01) |
| *B44C 5/04* | (2006.01) |
| *B44C 1/24* | (2006.01) |

(52) U.S. Cl.
CPC .............. *B32B 9/042* (2013.01); *B32B 21/02* (2013.01); *B32B 21/04* (2013.01); *B44C 1/24* (2013.01); *B44C 5/04* (2013.01); *E04F 13/0866* (2013.01); *E04F 13/10* (2013.01); *E04F 15/02161* (2013.01); *B32B 2255/08* (2013.01); *B32B 2307/412* (2013.01); *B32B 2307/75* (2013.01); *B32B 2419/04* (2013.01); *B32B 2451/00* (2013.01); *B32B 2607/02* (2013.01); *E04F 15/02038* (2013.01); *E04F 2201/0153* (2013.01); *E04F 2201/043* (2013.01)

(56) References Cited

U.S. PATENT DOCUMENTS

| | | |
|---|---|---|
| 2009/0155612 A1 | 6/2009 | Pervan et al. |
| 2010/0009102 A1* | 1/2010 | Vermeulen ............ E04F 15/02 428/34.1 |
| 2011/0250404 A1 | 10/2011 | Pervan et al. |
| 2016/0319554 A1 | 11/2016 | Thiers et al. |
| 2020/0130406 A1* | 4/2020 | Duernberger ............ B44F 9/02 |

FOREIGN PATENT DOCUMENTS

| | | |
|---|---|---|
| CN | 101909836 A | 12/2010 |
| CN | 104640643 A | 5/2015 |
| CN | 105960496 A | 9/2016 |
| EP | 1973751 A2 | 10/2008 |
| EP | 1 973 751 B1 | 4/2014 |
| WO | WO 2009/140760 A1 | 11/2009 |
| WO | WO 2012/004699 A2 | 1/2012 |
| WO | WO 2014/011110 A1 | 1/2014 |
| WO | WO2014011110 A1 | 1/2014 |
| WO | WO 2015/092745 A1 | 6/2015 |

OTHER PUBLICATIONS

Chinese Office Action with English translation, issued in CN Application No. 201680091866.5, dated Aug. 10, 2020, pp. 1-19, China Intellectual Property Administration, Beijing, China.
International Search Report, issued in International Application No. PCT/EP2016/082594, dated Jul. 10, 2017, pp. 1-3, European Patent Office, Rijswijk, Netherlands.
Ukraine Office Action with English Translation for Ukraine Patent Application No. 2019 06147, dated Nov. 2, 2021, 8 pages.
Chinese Office Action with English Translation for Chinese Patent Application No. 201680091866.5, dated Aug. 18, 2021, pp. 1-18, China National Intellectual Property Administration, Beijing, People's Republic of China.
He Yunxiao et al., "Practical Tutorial on Garden Building Materials," Sep. 2015, Southeast University Press, 8 pages.

* cited by examiner (state of the art)

PANELS IMITATING ORGANIC WOOD PLANKS COMPRISING SPECIALLY DECORATED EDGES

TECHNICAL FIELD

The present invention relates to panels imitating organic wood planks for floor- wall- or ceiling coverings. By applying a specially undulated edge line along and/or near at least one long edge of a panel, the illusion of an organic plank, which is longer than a single panel is created. The panels also create the illusion of long undulating, organic edges. The panels are preferably made of a wood fiber core (MDF or HDF) to which at least a decorative layer and a transparent top layer are added as is common in laminate flooring. The panels can also be made out of any other core material such as chipboards, oriented strand boards (OSB), cement fiber boards, PVC, plastic, ceramic or any other core material. The panels are preferably employed as a floor covering, but may also be used as a wall- or ceiling covering.

PRIOR ART

Different panels designed for ceiling- wall- or floor covering usually are packaged in boxes or in sets at a factory and finally assembled by a user. The practical length of such panels is limited, as it is desirable to transport such panels in an average car. For assembly, modern panels mostly include some type of joining system at the panel edges such as variants of tongue- and groove profiles which allow for rapid glueless connections of such panels.

Nearly all such profiles demand straight edges of the panels to be connected, especially if such a tongue- and groove system is additionally designed to be angled in as disclosed for example by WO1997047834A1.

Straight edges along rows of panels however have a rather strict, inorganic appearance which is esthetically undesirable when the panels are meant to imitate organic wood planks.

One solution known in the art to overcome this esthetically undesirable effect is the addition of an irregular bevel such as disclosed in WO2008031829A1. Adding bevels to a panel however is an expensive step in manufacturing since material mostly has to be milled away; bevels attract unwanted moisture from cleaning or from accidental spills and the overall effect is limited, as the irregular bevels still need to relative closely follow the straight line of the joining profiles, thus creating more of a staggered than an undulated edge.

Another solution known in the art is to provide a set of panels with irregular edges wherein certain panels or panel parts cooperate with certain other panels or panel parts. In this manner, undulating edges can be provided on panels that match each other for this. Such a solution is disclosed in EP 2 811 086. It is obvious however, that with a system wherein certain panels are only connectable to certain other panels, but not to all other panels, both logistical and economical problems arise: Logistical problems because out of a set or a box of panels only certain panels will match each other while others will not and thus there will always be the need to tediously find correctly matching panels. Economical problems because when cutting panels to fit an area to be covered, cut-off leftover parts remain which then do not match any other leftover parts so that far more leftover parts need to be discarded as otherwise necessary. Panels which have no more correspondingly matching other panels in a set or in a box will need to be unnecessarily discarded.

It is therefore the objective of the present invention to provide panels for floor-, wall- or ceiling coverings, which when installed by interconnection of a plurality of panels give the impression that the resulting floor-, wall- or ceiling covering is made of long, uninterrupted planks of natural wood.

SUMMARY OF THE INVENTION

The present invention refers to a rectangular panel for floor-, wall- or ceiling coverings comprising a visible decorative side, wherein the decorative side comprises at least one undulated edge line which extends along the long side edges of the panel, said undulated edge line being designed different than the rest of the decorative side, as set forth in claim 1. The dependent claims refer to preferred embodiments.

The present invention overcomes the problems mentioned above by providing panels which optically imitate an organic, undulated edge of a very long plank by applying a specially designed edge line near at least one straight physical panel edge.

In the panels according to the present invention the physical edges and the optical edges diverge which enables for the possibility that a plurality of panels can be installed as floor, ceiling, or wall covering in a way that the physical edges become almost invisible whereas the optical edges (i.e. the undulated edge lines) are perceived as artificial optical edge of virtual panels forming the covering.

The undulated edge line according to the invention preferably consists of a printed element and further optionally of an embossed element and of at least two lines with different gloss grades.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
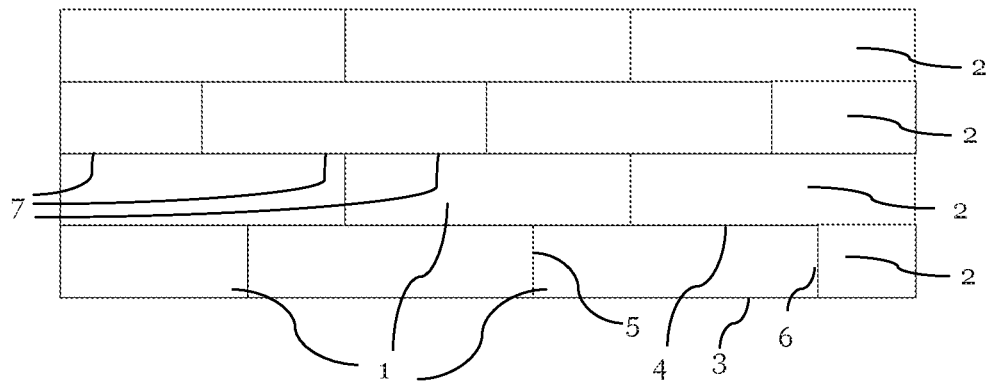
FIG. 1 Shows a front view of a surface covered with panels generally known in the art.

FIG. 1 shows a front view of a surface covered with panels (1) as are generally known in the art. The panels have a rectangular shape with two opposing long side edges (3, 4)

and two opposing short side edges (5, 6). Here it can be seen that by the physical long side edges (3, 4) of individual panels, long physical edge lines (7) are formed by the panel rows (2). These physical edge lines (7) along rows of panels however cause a rather strict, inorganic appearance which is esthetically undesirable, especially when the panels are meant to imitate long organic wood planks.

Figure 2:
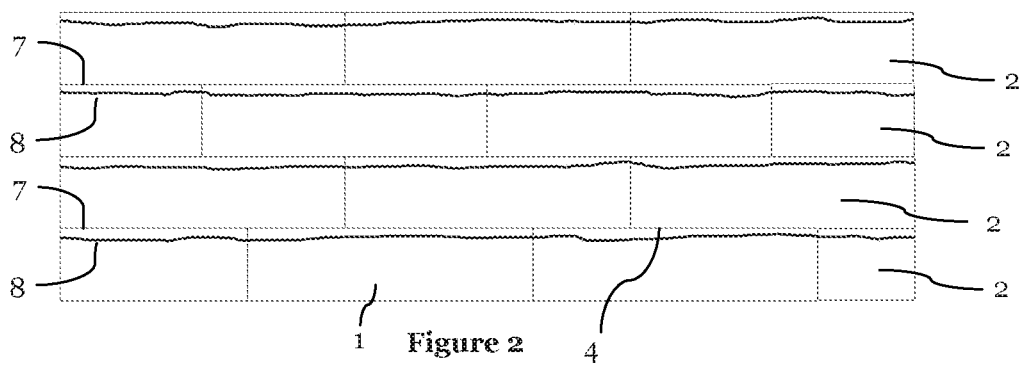
FIG. 2 Shows a front view of a surface covered with panels according to the invention in which the desired optical effect is emphasized.

FIG. 2 shows a front view of a surface covered with panels (1) according to the invention. By applying a specially designed undulated edge line (8) along at least one physical edge line (7) of a panel row (2) and by continuing this undulated edge line over several panels, the illusion of a very long undulated edge line and also the illusion of very long planks is created and the strict inorganic appearance of straight physical edge lines (7) is avoided. With laminated panels of 1285 mm length, the total width of the undulated edge line (8) is approximately 4 mm wide in average.

Preferably, the undulated edge line is darker than the rest of the decorative layer. The undulated edge line also can be designed to imitate natural parts of wood, such as e.g. the bark of wood. The decorative layer (except the undulated edge line) of the panel can be designed as e.g. sawn wood. However, the potential designs are not limited to the given example.

While it is possible to add further undulated edge lines (8) onto a panel according to the invention, for example near the middle of a panel in order to create the illusion of further edges on a single panel, preferred embodiments are made with a single undulated edge line (8) per panel.

Figure 3:
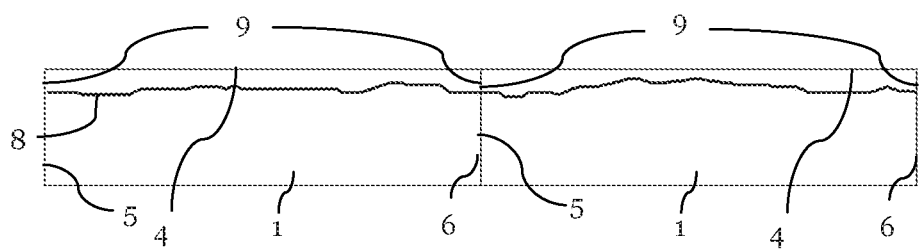
FIG. 3 Shows a front view of two panels according to the invention.

FIG. 3 shows a front view of two panels according to the invention, connected at their short sides (5, 6). The undulated edge line (8) preferably has the same or nearly the same distance (9) from the physical edge (4) of a panel at both ends (5, 6) of each panel, so that the illusion of a continuously undulated edge line (8) across a plurality of panels is created.

While the application of an undulated edge line (8) as described above already exhibits the desired organic effect, the illusion can be further enhanced by further means which concern the shape and the design of the undulated edge line (8) which will be explained in greater detail in the following.

Figure 4:
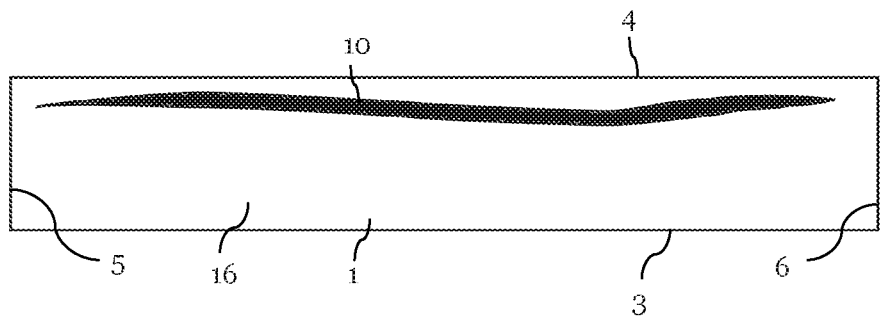
FIG. 4 Shows a front view of a panel according to the invention in which a printed line is emphasized.

FIG. 4 shows a simplified front view of a panel according to the invention. Here the printed part (10) of the undulated edge line (8) is shown slightly exaggerated. This printed part can either be an integral part of the panel décor, or it can be printed onto the décor in a separate step. The panel décor can be provided in a separate decorative layer (16) which can be provided on the constructive panel core (15) (cf. FIG. 8 below) of each panel.

Tests have shown that it is advantageous to thin out and even end the printed line near the panel short side edges (5, 6) so that a smooth transition of the undulated edge line (8) from one panel to another is made, as will be further described below. With laminated panels of 1285 mm length and 192 mm width, this printed line is approximately 2 mm wide on average. In order to effectively give the illusion of natural wooden material, the width of the printed line 10, however varies.

When the undulated edge lines (8) are led to the short edges (5, 6) and thus over the complete length of each panel (1), it is preferred that the undulated edge line (8) has a tangent which at both short side edges (5, 6) is perpendicular or nearly perpendicular to the respective short side edges (5, 6) crossed by the undulated edge line (8). This enables that the course or path of the undulated edge line (8) of a plurality of panels (1) when aligned in the direction of the long sides is strictly monotonic thus enhancing the illusion that the covering made up of the plurality of panels is made of long integrally formed panels.

Figure 5:
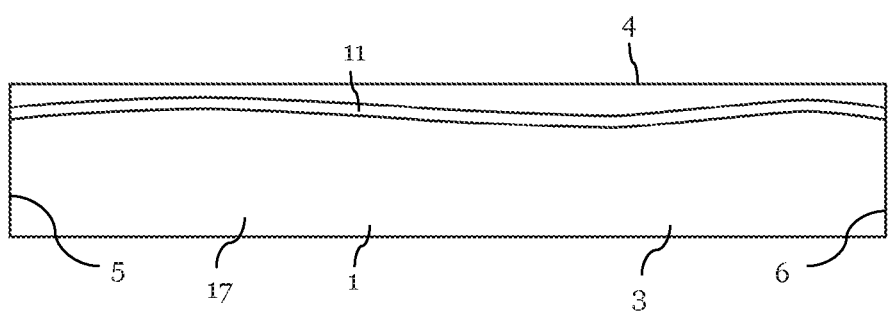
FIG. 5 Shows a front view of a panel according to the invention in which a embossed groove is emphasized.

FIG. 5 shows another simplified front view of a panel according to the invention. In this figure, the location of an embossed groove (11) is shown. This groove (11) follows the printed part (10) of the undulated edge line (8). Contrarily to the printed part (10) however, this groove (11) is preferably embossed up to the short side edges (5, 6) of the panel. With laminated panels of e.g. 1285 mm length and 192 mm width, this groove (11) is approximately 4 mm wide on average and about 150 micrometers deep. This embossing e.g. can be produced in that a transparent top layer (17) is added on top of the decorative layer (16), whereas the transparent top layer (17) has recesses wherever the undulated edge line (8) is present in the decorative layer. These recesses follow the path of the undulated edge line (8). The width of the recesses in the transparent top layer (17) can be the same or greater than the undulated edge line (8).

Figure 6:
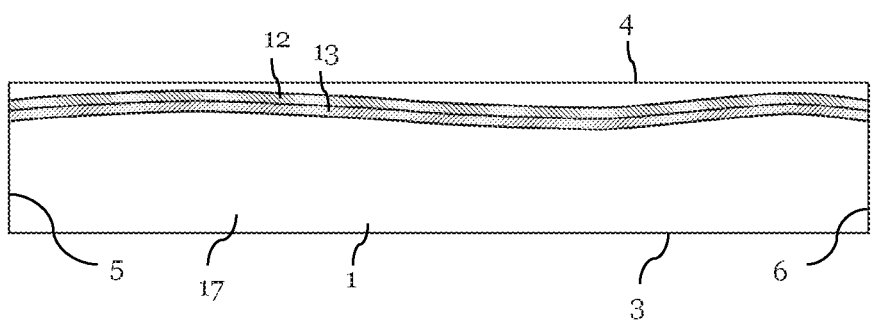
FIG. 6 Shows a front view of a panel according to the invention in which at least two lines with at least two different gloss grades above the embossed groove are emphasized.

FIG. 6 shows another simplified front view of a panel according to the invention. In this embodiment, the surface of the groove (11) has regions with different gloss grades. According to this example, the surface of the groove (11) is divided into two stripe-shaped areas or stripes (12, 13). These stripes (12, 13) have different or deviating gloss grades. With laminated panels of e.g. 1285 mm length and 192 mm width and in a preferred embodiment, one of these stripes (12) is a gloss line of approximately 2 mm width and the other (13) is a matte line with approximately 2 mm width. The presence of these two lines (12, 13) with two different gloss grades makes the groove (11) appear even deeper than it actually is. Experiments have shown that when the groove and the two stripes (12, 13) are actually wider than the printed part of undulated edge line (10), the total undulated edge line (8) seems to be much more prominent, enhancing the desired illusion.

Additionally, the exact positioning of the printed part of undulated edge line (10) in relation to the groove (11) and the gloss stripes (12, 13) is far less critical if the groove (11) and the stripes (12, 13) are both broader than the printed part of undulated edge line (10).

Figure 7:
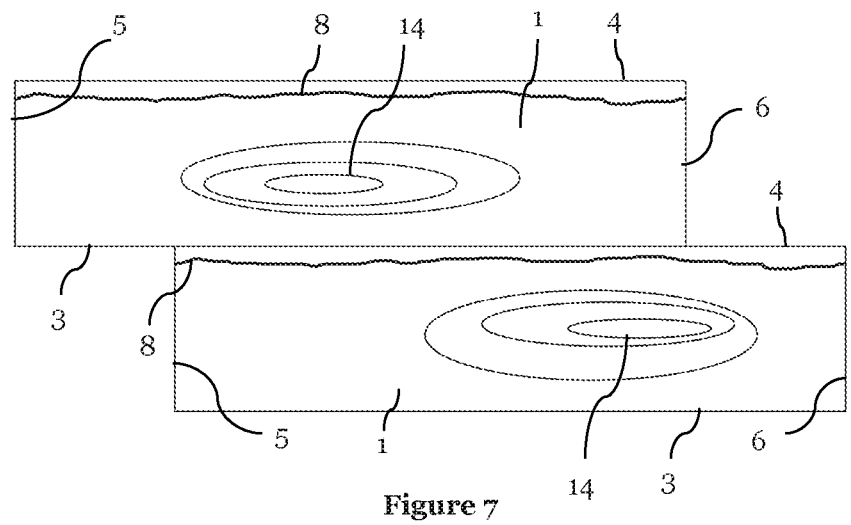
FIG. 7 Shows a front view of two panels according to the invention emphasizing the position of major décor elements.

FIG. 7 shows a simplified front view of two panels according to the invention. As the panels (1) of the invention preferably imitate long, organic wood planks, major décor elements (14) such as those that are found in natural wood (e.g. knots) are displayed on the decorative surface of the panels in preferred embodiments. Such major décor elements (14) are carefully chosen to be positioned at a distance away from the undulated edge line (8) of the invention so the eye of an observer focuses on the undulated edge line (8) which is then better perceived as an edge, thus further enhancing the desired illusion.

As it is desired that all panels out of a set or a box can be connected and can be matched to each other and in order to create the illusion of very long planks, it is highly desirable that the décor at both the short side edges (5, 6) and the long side edges (3, 4) of the panels also match each other.

One way to achieve this is to soften and slightly blur or fade out the décor near the all edges (3, 4, 5, 6) of the panels and to generally avoid placing major décor elements (14) near both the short side edges (5, 6) and the long side edges (3, 4). This is also the main reason for having the printed part of the undulated edge line to thin out and even end near the panel end edges (5, 6). With these measures, a generally smooth and slightly blurry pattern is created on all four physical edges, so that all panels out of a set or a box can be matched with each other.

Figure 8:
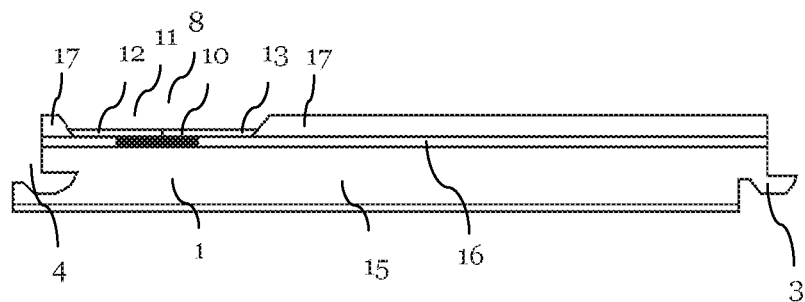
FIG. 8 Shows a schematic cross section of a panel according to the invention.

FIG. 8: Shows a schematic panel cross section of a preferred embodiment of the invention. Here the panel is a laminate panel with a wood fiber core (15).

The panel has a joining system at the edges (3, 4, 5, 6), here shown as a variant of a tongue- and groove profile at the long side edges (3, 4).

A decorative layer (16) is provided together with a printed part (10), an embossed groove part (11), and two gloss grade parts (12, 13) of the undulated edge line (10) as well as a transparent top layer (17).

Although the profile of the groove (11) is depicted as trapezoidal in FIG. 8, the profile of the groove (11) also can have V- or U-shaped profile.

LIST OF REFERENCE SIGNS

1 Panel
2 Panel row
3 Physical first edge of panel
4 Physical second edge of panel
5 Physical third edge of panel
6 Physical fourth edge of panel
7 Physical edge line
8 Undulated edge line
9 Distance between physical first edge of panel and undulated edge line
10 Printed part of undulated edge line
11 Embossed groove part of undulated edge line
12 First gloss grade part of groove part surface
13 Second gloss grade part of groove part surface
14 Major décor element
15 Panel core
16 Decorative layer
17 Transparent top layer

The invention claimed is:

1. A rectangular panel for floor-, wall- or ceiling coverings comprising: a visible decorative side, wherein the decorative side comprises at least one undulated edge line, which extends along a long side edge of the panel, said at least one undulated edge line having; i) a different design than the rest of the decorative side, ii) the same or nearly the same distance to the long side edge at both short side edges, and iii) a tangent, which at both short side edges, is perpendicular or nearly perpendicular to the respective short side edge crossed by the undulated edge line, wherein when two or more of the panels form a panel row, an illusion of a long plank is created and the strict inorganic appearance of straight physical edge lines is avoided.

2. The panel of claim 1, wherein the undulated edge line is part of a decorative layer.

3. The panel of claim 1, wherein the undulated edge line comprises a printed part.

4. The panel of claim 3, wherein the undulated edge line is part of a decorative layer, and wherein the printed part of the undulated edge line forms a contrast to the rest of the decorative layer.

5. The panel of claim 3, wherein the printed part of the undulated edge line thins out near the short edge sides of the panel.

6. The panel of claim 1, wherein the panel further comprises a transparent top layer into which a groove part of the undulated edge line is embossed.

7. The panel of claim 6, wherein the undulated edge line comprises a printed part, and wherein the groove part of the undulated edge line is broader than the printed part of the undulated edge line.

8. The panel of claim 6, wherein a surface of the groove part has a homogeneous gloss grade or comprises parts, which have different gloss grades.

9. The panel of claim 1, wherein no major design elements are positioned near the long side edge.

10. The panel of claim 1, wherein the design of the decorative side blurs at the long side edge and/or the short side edges.

11. The panel of claim 1, wherein the panel comprises connecting means on at least both of the long side edges of the panels.

12. The panel of claim 7, wherein the groove part of the undulated edge line is greater than 1 and less than or equal to 3 times as broad as the printed part of the undulated edge line.

13. The panel of claim 7, wherein the groove part of the undulated edge line is approximately twice as broad as the printed part of the undulated edge line.

14. The panel of claim 8, wherein the surface of the groove part has a homogenous gloss grade or comprises at least two parallel running strips, which have different gloss grades.

15. The panel of claim 3, wherein the undulated edge line is part of a decorative layer, wherein the printed part of the undulated edge line forms a contrast to the rest of the decorative layer, and wherein the design of the decorative layer blurs at the long side edge and/or the short side edges.

* * * * *

UNITED STATES PATENT AND TRADEMARK OFFICE
CERTIFICATE OF CORRECTION

PATENT NO. : 11,280,095 B2
APPLICATION NO. : 16/469522
DATED : March 22, 2022
INVENTOR(S) : Bircham Page 1 of 1

It is certified that error appears in the above-identified patent and that said Letters Patent is hereby corrected as shown below:

In the Claims

Column 5, Claim 1, Line 40, delete ";" and replace with --:--

Signed and Sealed this
Third Day of May, 2022

*Katherine Kelly Vidal*

Katherine Kelly Vidal
*Director of the United States Patent and Trademark Office*